(12) United States Patent
Cho et al.

(10) Patent No.: US 8,264,637 B2
(45) Date of Patent: Sep. 11, 2012

(54) PHOTONIC CRYSTAL OPTICAL FILTER, REFLECTIVE COLOR FILTER, DISPLAY APPARATUS USING THE REFLECTIVE COLOR FILTER, AND METHOD OF MANUFACTURING THE REFLECTIVE COLOR FILTER

(75) Inventors: Eun-hyoung Cho, Seoul (KR); Jin-seung Sohn, Seoul (KR); Seock-hwan Kang, Suwon-si (KR); Hae-sung Kim, Hwaseong-si (KR); Xianyu Wenxu, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 319 days.

(21) Appl. No.: 12/461,455

(22) Filed: Aug. 12, 2009

(65) Prior Publication Data

US 2010/0091224 A1 Apr. 15, 2010

(30) Foreign Application Priority Data

Oct. 10, 2008 (KR) .................. 10-2008-0099774
Feb. 11, 2009 (KR) .................. 10-2009-0011215

(51) Int. Cl.
*G02F 1/1335* (2006.01)
*G02F 1/141* (2006.01)
*G02B 6/00* (2006.01)

(52) U.S. Cl. ............... 349/62; 349/37; 385/11
(58) Field of Classification Search ........... 349/62, 349/37; 385/11
See application file for complete search history.

(56) References Cited

U.S. PATENT DOCUMENTS

| | | | | |
|---|---|---|---|---|
| 5,998,298 A | * | 12/1999 | Fleming et al. | 438/692 |
| 6,064,511 A | * | 5/2000 | Fortmann et al. | 359/321 |
| 6,631,236 B2 | * | 10/2003 | Yamada | 385/129 |
| 7,194,174 B2 | * | 3/2007 | Dridi et al. | 385/129 |
| 7,345,818 B2 | * | 3/2008 | Toda et al. | 359/452 |
| 7,421,179 B1 | * | 9/2008 | Jiang et al. | 385/129 |
| 7,447,404 B2 | * | 11/2008 | Miller | 385/43 |
| 2001/0026668 A1 | * | 10/2001 | Yamada | 385/125 |
| 2003/0025863 A1 | * | 2/2003 | Iijima | 349/122 |
| 2004/0264903 A1 | * | 12/2004 | Dridi et al. | 385/129 |
| 2005/0238310 A1 | * | 10/2005 | Hoshi et al. | 385/129 |
| 2006/0159411 A1 | * | 7/2006 | Miller | 385/129 |
| 2007/0002438 A1 | * | 1/2007 | Toda et al. | 359/452 |
| 2009/0116029 A1 | * | 5/2009 | Ohtera et al. | 356/456 |
| 2010/0014821 A1 | * | 1/2010 | Tokushima | 385/129 |

* cited by examiner

*Primary Examiner* — K. Cyrus Kianni
(74) *Attorney, Agent, or Firm* — Harness, Dickey & Pierce, P.L.C.

(57) ABSTRACT

Example embodiments relate to a photonic crystal optical filter, a reflective color filter using the photonic crystal optical filter, a display apparatus using the reflective color filter, and a method of manufacturing the reflective color filter. The photonic crystal optical filter may include a transparent substrate; a barrier layer formed on the transparent substrate; and a photonic crystal layer formed on the barrier layer. The photonic crystal layer may have a structure in which a first material having a relatively high refractive index and a second material having a relatively low refractive index are periodically arranged so as to reflect light having a wavelength band corresponding to a photonic band gap.

28 Claims, 9 Drawing Sheets

PHOTONIC CRYSTAL OPTICAL FILTER, REFLECTIVE COLOR FILTER, DISPLAY APPARATUS USING THE REFLECTIVE COLOR FILTER, AND METHOD OF MANUFACTURING THE REFLECTIVE COLOR FILTER

CROSS-REFERENCE TO RELATED APPLICATIONS

This application claims priority under 35 U.S.C. §119 to Korean Patent Application No. 10-2008-0099774, filed on Oct. 10, 2008 with the Korean Intellectual Property Office, and Korean Patent Application No. 10-2009-0011215, filed on Feb. 11, 2009 with the Korean Intellectual Property Office, the disclosures of which are incorporated herein in their entirety by reference.

BACKGROUND

1. Field

Example embodiments relate to an optical filter, a color filter using the optical filter, a display apparatus including an optical f the color filter, and a method of manufacturing the color filter.

2. Description of the Related Art

Color filters are conventionally manufactured using a pigment dispersion method in which a solution containing a dispersed pigment is coated on a photoresist and the photoresist is patterned. Because the pigment dispersion method uses a photolithography method, a relatively large-sized screen may be realized not only with thermal and chemical stabilities but also with color uniformity. However, because the color characteristics of such pigment-type color filters are determined by unique absorption spectrums of the dispersed pigment and the light transmissivity is decreased as the thickness of the pigment type color filters is increased, luminance is decreased with regard to higher color purity color filters.

There has been recent interest in photonic crystal color filters based on structural colors. The photonic crystal color filters use nanostructures which are smaller than the wavelengths of light to control the reflection or absorption of light incident from the outside, to thereby reflect (or transmit) light of desired colors and transmit (or reflect) light of undesired colors. The photonic crystal color filters have a structure in which nano-sized unit blocks are periodically arranged at predetermined intervals. The optical characteristics of the photonic crystal color filters are determined by the size and periods of the nanostructures, and thus the photonic crystal color filters having improved wavelength selectivity and a color bandwidth that may be adjusted with relative ease may be manufactured by manufacturing predetermined nanostructures that are appropriate for a predetermined wavelength. Also, because of the optical characteristics of the photonic crystal color filters, the photonic crystal color filters may be applied with relative ease to reflective liquid crystal display apparatuses that use external light having a wider spectrum distribution.

SUMMARY

Example embodiments relate to a photonic crystal optical filter, a reflective color filter realizing higher color purity using the photonic crystal optical filter, a display apparatus including the reflective color filter, and a method of manufacturing the reflective color filter.

A photonic crystal optical filter according to example embodiments may include a transparent substrate; a barrier layer on the transparent substrate; and a photonic crystal layer on the barrier layer, the photonic crystal layer having a first material periodically arranged within a second material and an optical cut-off layer on the first material, a refractive index of the first material being higher than a refractive index of the second material, the photonic crystal layer configured to reflect light having a wavelength band corresponding to a photonic band gap.

The first material may be formed into island-shaped patterns. A difference between the real parts of the refractive indices of the first material and the second material may be about 2 or greater, and the imaginary parts of the refractive indices of the first material and the second material may be about 0.1 or smaller in a visible light wavelength band. An absorption layer may be further formed on a lower portion of the transparent substrate. The first material may be formed into island-shaped patterns, and the second material may be formed as a supporting layer that supports the island-shaped patterns formed of the first material. The barrier layer may be formed of a material that is the same as the second material.

A reflective color filter according to example embodiments may include a transparent substrate; a barrier layer on the transparent substrate and including a plurality of pixel areas; and a plurality of photonic crystal units on the plurality of pixel areas, each photonic crystal unit having a first material periodically arranged within a second material and an optical cut-off layer on the first material, a refractive index of the first material being higher than a refractive index of the second material, the photonic crystal unit configured to reflect light having a wavelength band corresponding to a photonic band gap.

The plurality of photonic crystal units may include a plurality of red photonic crystal units reflecting red color light; a plurality of green photonic crystal units reflecting green color light; and a plurality of blue photonic crystal units reflecting blue color light. The plurality of red photonic crystal units, green photonic crystal units, and blue photonic crystal units may be arranged in striped patterns, in mosaic patterns, or in delta patterns.

The first material may be formed into island-shaped patterns. A difference between the real parts of refractive indices of the first material and the second material may be about 2 or greater, and the imaginary parts of the refractive indices of the first material and the second material may be about 0.1 or smaller in a visible light wavelength band. An absorption layer may be formed on a lower portion of the transparent substrate. The first material may be formed into island-shaped patterns, and the second material may be formed as a supporting layer that supports the island-shaped patterns formed of the first material. The barrier layer may be formed of a material that is the same as the second material.

A display apparatus according to example embodiments may include a liquid crystal layer of which transmissivity with respect to incident light is electrically controlled; the reflective color filter according to example embodiments that reflects light having a wavelength band corresponding to a photonic band gap among light incident on the liquid crystal layer; an absorption layer formed on a lower portion of the transparent substrate; and a thin film transistor (TFT)-array layer including a plurality of TFTs that drive the liquid crystal layer according to image information. The plurality of TFTs may be formed in each of the pixel areas adjacent to the plurality of photonic crystal units, wherein the plurality of TFTs and the plurality of photonic crystal units are formed on the transparent substrate.

A method of manufacturing a reflective color filter according to example embodiments may include forming a barrier layer on a transparent substrate; and forming an photonic crystal layer on the barrier layer, the photonic crystal layer having a first material periodically arranged as island-shaped patterns within a second material and an optical cut-off layer formed on the first material, a refractive index of the first material being higher than a refractive index of the second material.

BRIEF DESCRIPTION OF THE DRAWINGS

The above and/or other aspects of example embodiments may become more apparent and readily appreciated when the following description is taken in conjunction with the accompanying drawings of which.

DETAILED DESCRIPTION

Figure 1:
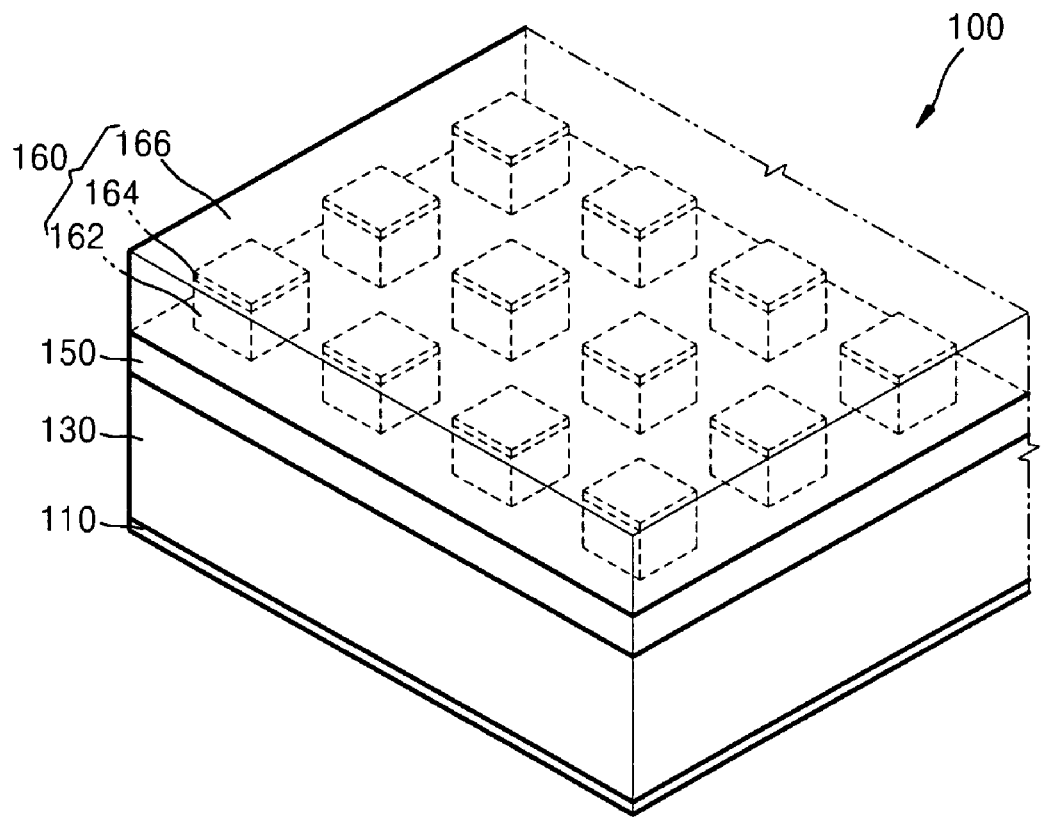
FIG. 1 is a perspective view of a photonic crystal optical filter according to example embodiments.

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
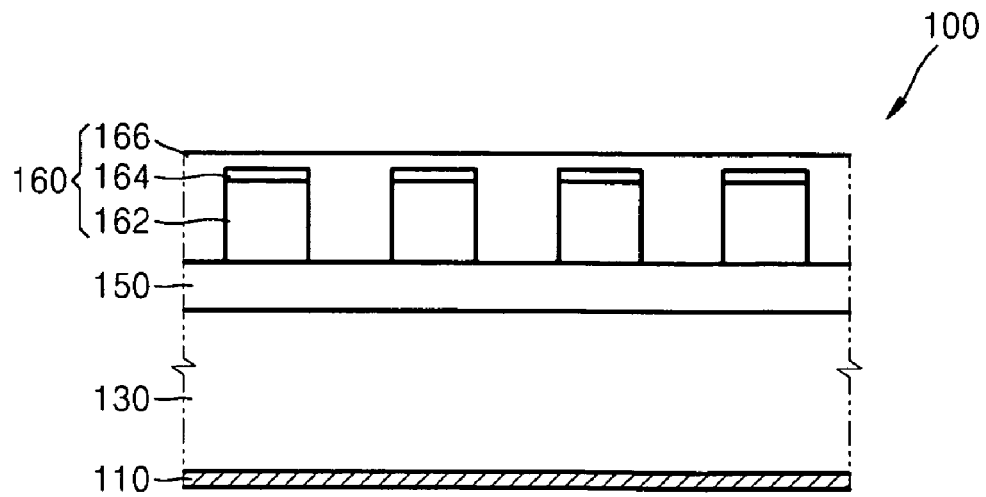
FIG. 2 is a cross-sectional view of the photonic crystal optical filter of FIG. 1.

FIG. 1 is a perspective view of a photonic crystal optical filter 100 according to example embodiments. FIG. 2 is a cross-sectional view of the photonic crystal optical filter 100 of FIG. 1. Referring to FIGS. 1 and 2, the photonic crystal optical filter 100 may include a transparent substrate 130 on which a barrier layer 150 is formed, and a photonic crystal layer 160 formed on the barrier layer 150. An absorption layer 110 may be further formed on a lower portion of the transparent substrate 130. The photonic crystal layer 160 may be formed to reflect light having a wavelength band corresponding to a photonic band gap according to a periodical distribution of the refractive indices of the photonic crystal layer 160. The photonic crystal layer 160 has a structure in which a first material 162 having a relatively high refractive index and a second material 166 having a relatively low refractive index are periodically arranged, and an optical cut-off layer 164 is formed on the first material 162.

The first material 162 may be formed into island-shaped patterns. The island-shaped patterns in FIGS. 1 and 2 are rectangular parallelepiped but may also be cylinder-shaped, polygonal pillar-shaped, or otherwise suitably shaped. The first material 162 has a larger refractive index than the second material 166. For example, a difference between the real parts of the refractive index of the first material 162 and the second material 166 may be about 2 or greater. In addition, a difference between the imaginary parts of the refractive indices of the first material 162 and the second material 166 may be about 0.1 or smaller in wavelength bands of visible light. When the imaginary part of the refractive index is relatively large, reflectivity is reduced, and thus a material having a refractive index with a relatively small imaginary part is used. The first material 162 may be one selected from the group consisting of mono-crystal silicon, poly silicon (poly Si), AlSb, AlAs, AlGaAs, AlGaInP, BP, $ZnGeP_2$, and mixtures thereof. The second material 166 may be one selected from the group consisting of Air, PC, PS, PMMA, $Si_3N_4$, $SiO_2$ and mixtures thereof.

The second material 166 may be formed as a supporting layer that supports island-shaped patterns of the first material 162. As illustrated in FIGS. 1 and 2, the second material 166 may be formed to cover spaces between the patterns of the first material 162 and upper portions of the first material 162. For example, the above-described structure of the second material 166 may be used to protect patterns of the first material 162 which are formed using amorphous silicon and crystallized to mono-crystal silicon or poly Si.

The optical cut-off layer 164 may improve the cut-off characteristics of the photonic crystal optical filter 100. The optical cut-off layer 164 may be formed as a silicon oxide layer ($SiO_2$) or a silicon nitride layer ($Si_3N_4$). The transparent substrate 130 is formed to function as a waveguide. Only light having a predetermined wavelength is reflected by the crystalline structure of the photonic crystal layer 160, and light other than the light having a predetermined wavelength is transmitted and confined in the transparent substrate 130. The transparent substrate 130 may be a glass substrate.

The barrier layer 150 may be formed between the transparent substrate 130 and the photonic crystal layer 160, and has the function of preventing or decreasing reductions in crystalline purity of silicon as impurities inside a glass substrate used as the transparent substrate 130 may migrate into a silicon material used as the first material 162 of the photonic crystal layer 160 during a crystallization process. The barrier layer 150 may be formed of a material having a similar refractive index to the refractive index of the transparent substrate 130. The barrier layer 150 may be formed of a material that is the same as the material that is selected as the second material 166 forming the supporting layer. The absorption layer 110 may be further formed on a lower portion of the transparent substrate 130, and may improve reflectivity characteristics of the photonic crystal optical filter 100 by absorbing light confined in the transparent substrate 130.

The photonic crystal optical filter 100 having the above-described structure may reflect light having a predetermined wavelength band using the photonic crystalline structure having a periodical distribution of refractive indices. Because the range and width of the wavelength band are determined by the shape and periods of the patterns of the first material 162, the wavelength bands of light may be selected with relative ease, and also, the photonic crystal optical filter 100 has an improved filtering performance and thus may be used in various technical fields. For example, the photonic crystal optical filter 100 may be applied to solar cells, quantum dot light emitting diodes (QD-LED), organic light-emitting diodes (OLED), etc. Also, as will be described below, the photonic crystal optical filter 100 may be applied as a color filter of a display apparatus.

Figure 3:
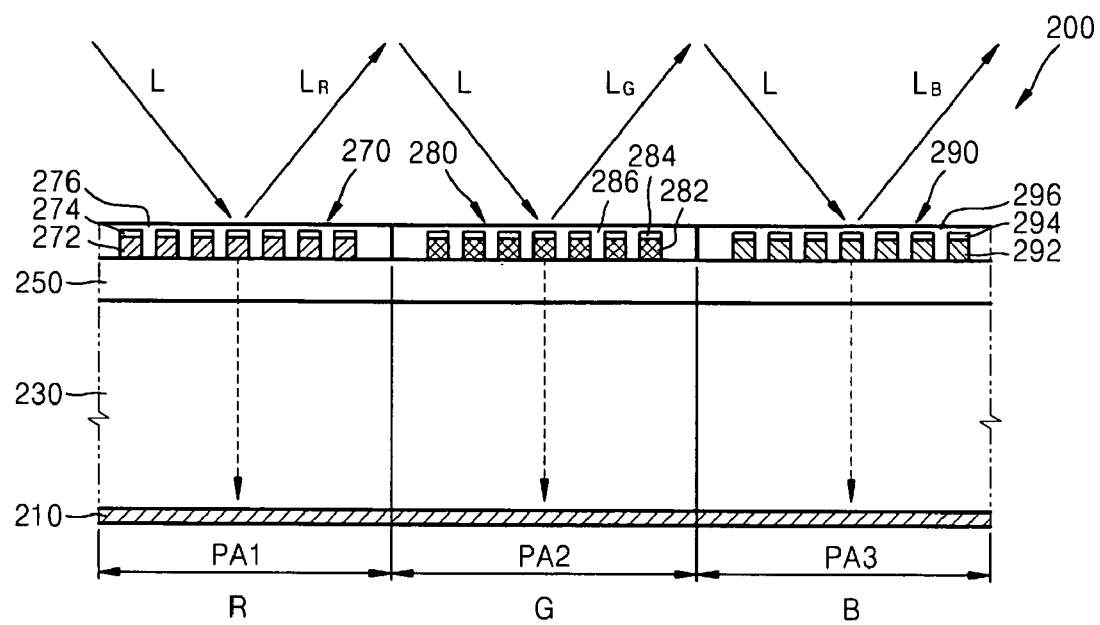
FIG. 3 is a cross-sectional view of a reflective color filter according to example embodiments.

FIG. 3 is a cross-sectional view of a reflective color filter 200 according to example embodiments. Referring to FIG. 3, the reflective color filter 200 may include a transparent substrate 230, a barrier layer 250 formed on the transparent substrate 230, and red, green, and blue photonic crystal units 270, 280, and 290, respectively, formed on the barrier layer 250 and reflecting light having a predetermined wavelength band.

A plurality of pixel areas PA1, PA2, and PA3 may be formed on the barrier layer 250. For example, the red photonic crystal unit 270 reflecting red color light $L_R$ among incident light L is formed in the pixel area PA1, the green photonic crystal unit 280 reflecting green light $L_G$ among incident light L is formed in the pixel area PA2, and the blue photonic crystal unit 290 reflecting blue light $L_B$ among incident light L is formed in the pixel area PA3. First materials 272, 282, and 292 having a relatively high refractive index and second materials 276, 286, and 296 having a relatively low refractive index are periodically formed in the red photonic crystal unit 270, the green photonic crystal unit 280, and the blue photonic crystal unit 290, respectively, and optical cut-off layer 274, 284, and 294 are formed on the first materials 272, 282, and 292, respectively. The first materials 272, 282, and 292 may be formed into island-shaped patterns.

The materials of the first materials 272, 282, and 292, the second materials 276, 286, and 296, and the optical cut-off layers 274, 284, and 294 in the red photonic crystal unit 270, the green photonic crystal unit 280, and the blue photonic crystal unit 290 may be selected from the various materials used to form the first material 162, the second material 166, and the optical cut-off layer 164 of the photonic crystal optical filter 100. Also, the materials of the first materials 272, 282, and 292, the second materials 276, 286, and 296, and the optical cut-off layers 274, 284, and 294 may be identical or different, and the patterns and periods of the first materials 272, 282, and 292 may be selected differently such that each of red photonic crystal unit 270, green photonic crystal unit 280 and blue photonic crystal unit has photonic band gap corresponding to red, green, and blue colors, respectively. For example, the patterns formed with the first material 272 of the red photonic crystal unit 270 may have a larger size and period than the patterns of the first material 282 of the green photonic crystal unit 280 or the patterns of the first material 292 of the blue photonic crystal unit 290. Also, the patterns of the first material 282 of the green photonic crystal unit 280 may have a larger size and period than the patterns of the first material 292 of the blue photonic crystal unit 290.

An absorption layer 210 may be further formed on a lower portion of the transparent substrate 230. The absorption layer 210 absorbs light confined in the transparent substrate 230. For instance, the light of the colors that is not reflected on the red photonic crystal unit 270, the green photonic crystal unit 280, and the blue photonic crystal unit 290 is confined in the transparent substrate 230 and is absorbed by the absorption layer 210. Accordingly, color purity of the color filter 200 is increased. In FIG. 3, the red, green, and blue photonic crystal units 270, 280, and 290 forming a basic pixel are illustrated. However, the reflective color filter 200 substantially has a structure in which the red, green, and blue photonic crystal units 270, 280, and 290 are repeatedly arranged.

Figure 4A:
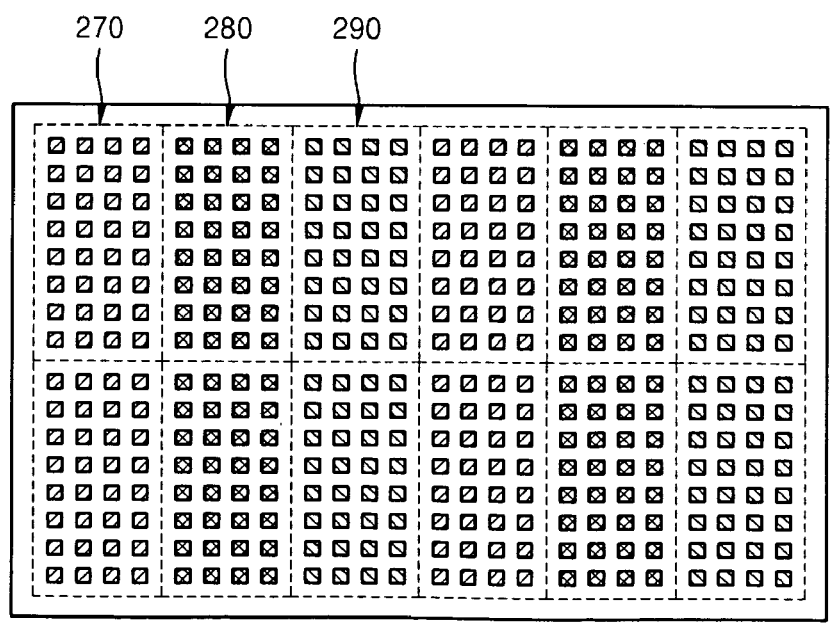
FIGS. 4A through 4C are plan views of the plurality of photonic crystal units of the reflective color filter of FIG. 3.
Figure 4B:
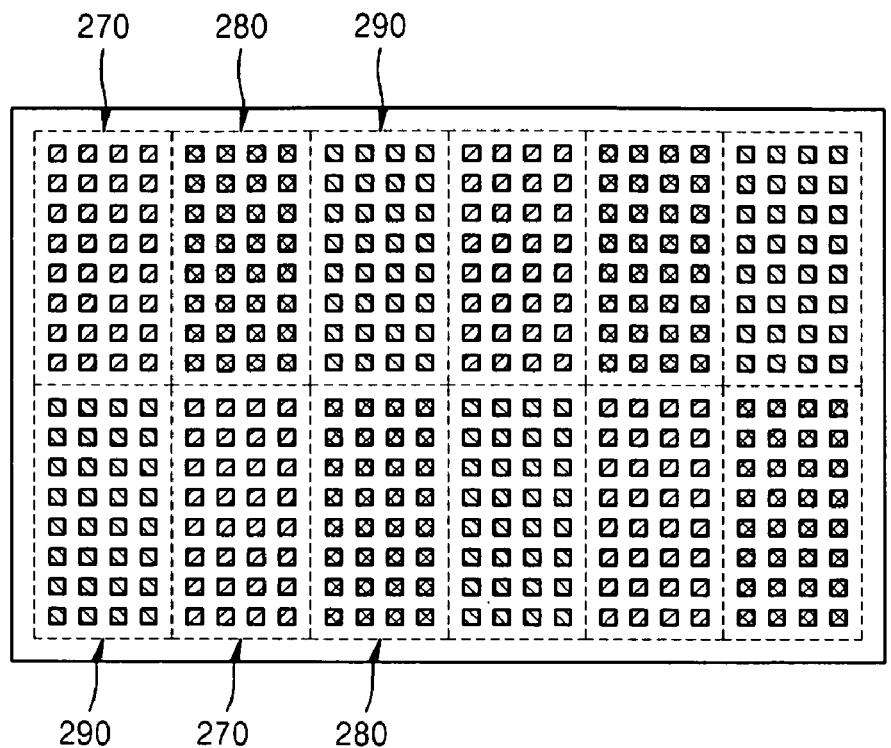
Figure 4C:
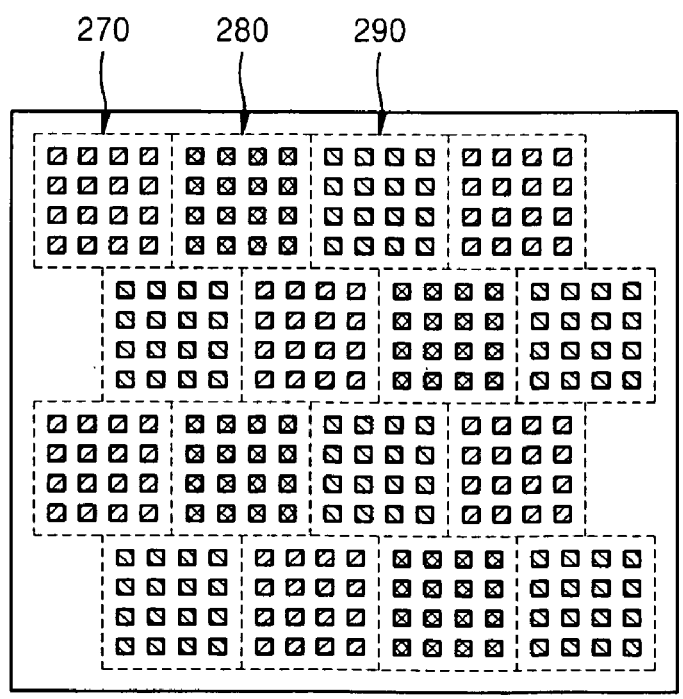

FIGS. 4A through 4C are plan views of the plurality of the red, green, and blue photonic crystal units 270, 280, and 290 of the reflective color filter 200 of FIG. 3. FIG. 4A illustrates the plurality of the red photonic crystal units 270, the green photonic crystal units 280, and the blue photonic crystal units 290 forming striped patterns such that red, green and blue photonic crystal units 270, 280 and 290 are arranged in straight lines, respectively. FIG. 4B illustrates the plurality of the red photonic crystal units 270, the green photonic crystal units 280, and the blue photonic crystal units 290 arranged such that different colors are adjacent to one another in a mosaic shape. FIG. 4C illustrates the plurality of red, green, and blue photonic crystal units 270, 280, and 290 arranged in a delta shape such that lines connecting the centers of the plurality of red, green, and blue photonic crystal units 270, 280, and 290 to one another form delta (Δ) shapes. Although not illustrated in FIGS. 4A through 4C in detail, the sizes and periods of the patterns of the red photonic crystal units 270, the green photonic crystal units 280, and the blue photonic crystal units 290 may be determined differently so as to correspond to photonic band gaps of red, green, and blue color lights. For example, the sizes and periods of the red photonic crystal units 270 may be the largest, and the sizes and periods of the blue photonic crystal units 290 may be the smallest.

Figure 5:
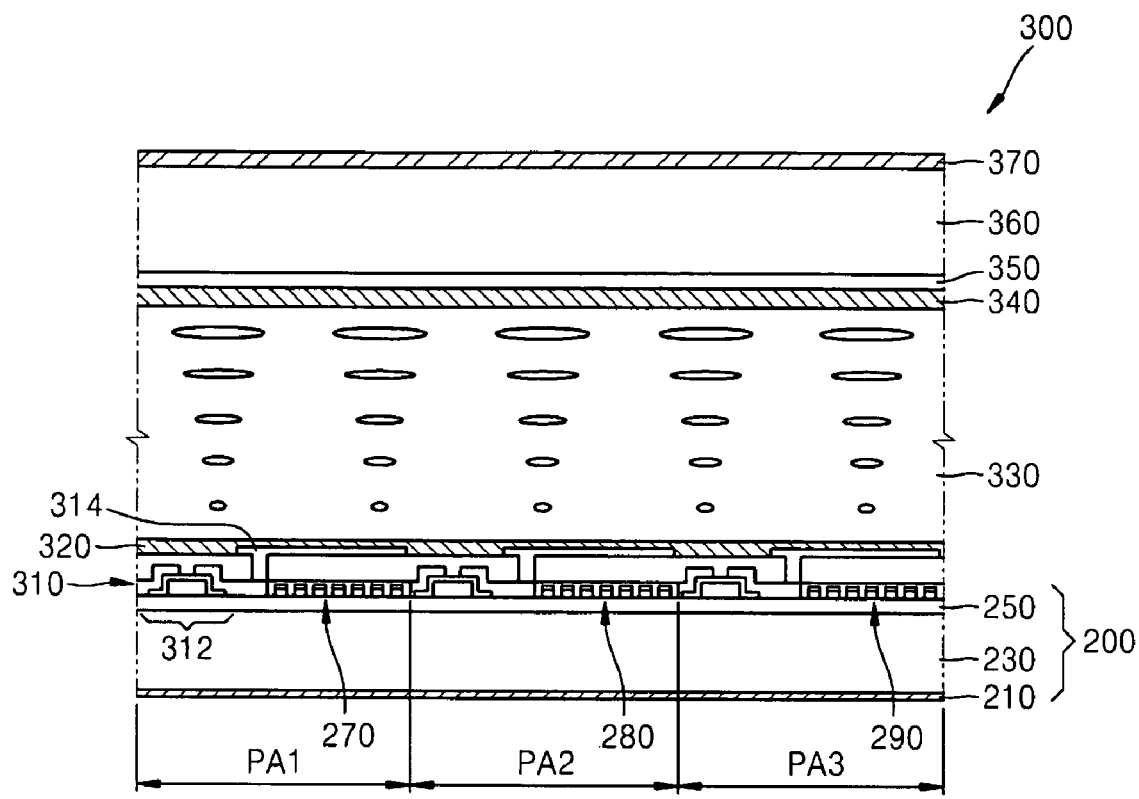
FIG. 5 is a cross-sectional view of a display apparatus according to example embodiments.

FIG. 5 is a cross-sectional view of a display apparatus 300 according to example embodiments. Referring to FIG. 5, the display apparatus 300 may include a liquid crystal layer 330 in which transmissivity of incident light is electrically controlled, a reflective color filter 200 reflecting light of a predetermined wavelength band corresponding to a photonic band gap among the incident light incident through the liquid crystal layer 330, and a thin film transistor (TFT)-array layer 310 including a plurality of TFTs 312 that drive the liquid crystal layer 330 according to image information. The reflective color filter 200 of FIG. 5 may have substantially the same structure as the reflective color filter 200 described with reference to FIG. 3. Thus, the description thereof will be omitted for purposes of brevity.

The TFT-array layer 310 may include the plurality of TFTs 312 and a plurality of pixel electrodes 314. The plurality of TFTs 312 that drive the liquid crystal layer 330 according to each of the pixels may be formed adjacent to a plurality of red, green, and blue photonic crystal units 270, 280, and 290 in each of the pixel areas PA1, PA2, and PA3. For instance, the plurality of TFTs 312 and the red, green, and blue photonic crystal units 270, 280, and 290 may be formed on one substrate, e.g., the transparent substrate 230.

The liquid crystal layer 330, of which the transmissivity in regard to incident light changes according to an electrical control, may be formed between transparent substrates 230 and 360. Alignment layers 340 and 320 may be formed on upper and lower portions of the liquid crystal layer 330, respectively. The liquid crystal layer 330 may be formed of various types of liquid crystals. For example, the liquid crystal layer 330 may be formed of twisted nematic (TN) liquid crystals, mixed-mode TN (MTN) liquid crystals, polymer dispersed liquid crystals (PDLC), Heilmeier-Zanoni (HZ) liquid crystals, Cole-Kashnow (CK) liquid crystals, etc. A transparent electrode 350 is formed on a surface of the transparent substrate 360 facing the liquid crystal layer 330, and a polarization plate 370 is formed on the other surface of the upper transparent substrate 360. The polarization plate 370 may not be used according to the type or the driving mode of the liquid crystal layer 330, or an additional polarization plate (not shown) (having a polarization axis that is vertical to a polarization axis of the polarization plate 370 or a quarter wavelength plate (not shown) may be further included.

The display apparatus 300 has a structure in which the red, green, and blue photonic crystal units 270, 280, and 290 of the reflective color filter 200 and the plurality of TFTs 312 are formed on one substrate, e.g., the transparent substrate 230. Accordingly, the reflective color filter 200 and the TFT-array layer 310 may be formed in one process. The above-described structure of the display apparatus 300 may reduce manufacturing errors compared to a conventional liquid crystal display apparatus in which a color filter is formed on an upper substrate and a TFT array is formed on a lower substrate. For example, in a conventional liquid crystal display where the color filter and the TFT array are separately manufactured and coupled to each other, coupling in alignment based on units of pixels is required. Thus, alignment errors may occur. However, because the color filter 200 and the TFT array layer 310 according to example embodiments may be formed on one substrate, such errors may be reduced.

According to the display apparatus 300, the plurality of TFTs 312 and the red, green, and blue photonic crystal units 270, 280, and 290 may be formed on one substrate, although example embodiments are not limited thereto. For example, the reflective color filter 200 and the TFT-array layer 310 may be formed as separate layers.

FIG. 6A through 6M are cross-sectional views of a method of manufacturing a reflective color filter 400 according to example embodiments. The method of manufacturing the reflective color filter 400 according to example embodiments may include forming a barrier layer on a transparent substrate; forming a photonic crystal layer having a structure in which a first material having a relatively high refractive index and a second material having a relatively low refractive index are periodically arranged, wherein the first material is island-shaped patterns and an optical cut-off layer is formed on the first material; and forming an absorption layer on a lower portion of the transparent substrate.

Figure 6A:
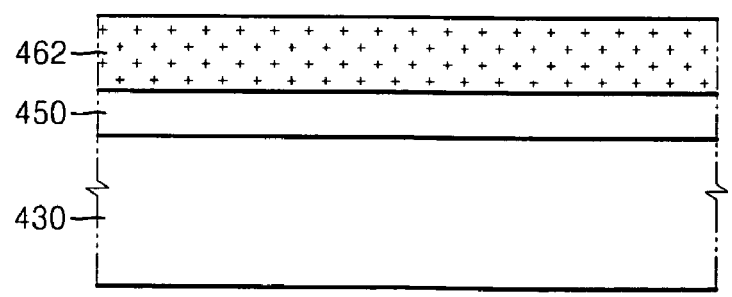
FIG. 6A through 6M are cross-sectional views of a method of manufacturing a reflective color filter according to example embodiments.

Referring to FIG. 6A, a barrier layer 450 and a silicon layer 462 corresponding to the first material may be sequentially formed on a transparent substrate 430. The transparent substrate 430 may be a glass substrate. The silicon layer 462 may be used because silicon has a relatively large refractive index in its real part and a relatively small refractive index in its imaginary part. Such characteristics are more evident in the case of mono-crystal silicon or poly silicon (poly Si). The silicon layer 462 may be formed of amorphous silicon, and in such a case, the silicon layer 462 may undergo a recrystallization process, as will be described later.

The barrier layer 450 may be formed on the transparent substrate 430, as it may be problematic to directly form a mono-silicon thin layer on a glass substrate. For instance, impurities of the glass substrate used as the transparent substrate 430 may migrate into the silicon layer 462 during a recrystallization process, which will be described later, and decrease the crystalline purity of the silicon layer 462. However, the barrier layer 450 may reduce or prevent the occurrence of this phenomenon, and may also function as an etch stop layer when the silicon layer 462 is etched, thereby reducing process errors (e.g., under-trenching). The barrier layer 450 may be formed of various suitable materials, e.g., poly carbonate (PC), poly styrene (PS), poly methyl methacrylate (PMMA), $Si_3N_4$, $SiO_2$, etc., or a material that has a refractive index having a small difference from that of the transparent substrate 430.

Figure 6B:
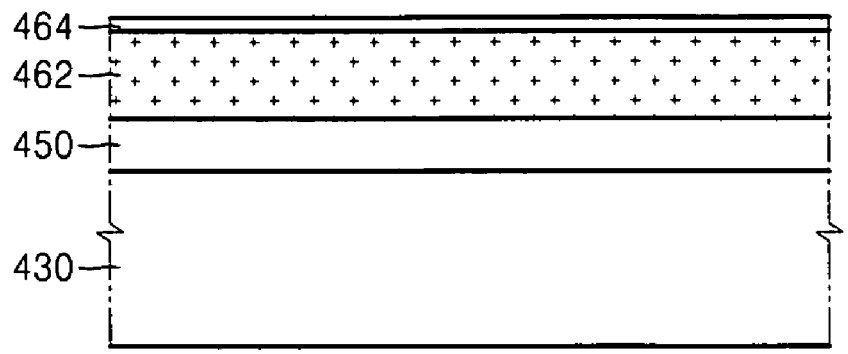

Referring to FIG. 6B, a hard mask layer 464 may be formed on the silicon layer 462. When the silicon layer 462 is patterned, the hard mask layer 464 functions as a hard mask for etching, and also provides etching selectivity. The hard mask layer 464 may be formed as a silicon oxide layer ($SiO_2$) or a silicon nitride layer ($Si_3N_4$). A portion of the hard mask layer 464 remains after the silicon layer 462 is patterned and improves the cut-off characteristics of the manufactured reflective color filter 400, because the silicon oxide layer ($SiO_2$) or the silicon nitride layer ($Si_3N_4$) has a lower refractive index than a silicon layer 462.

Figure 6C:
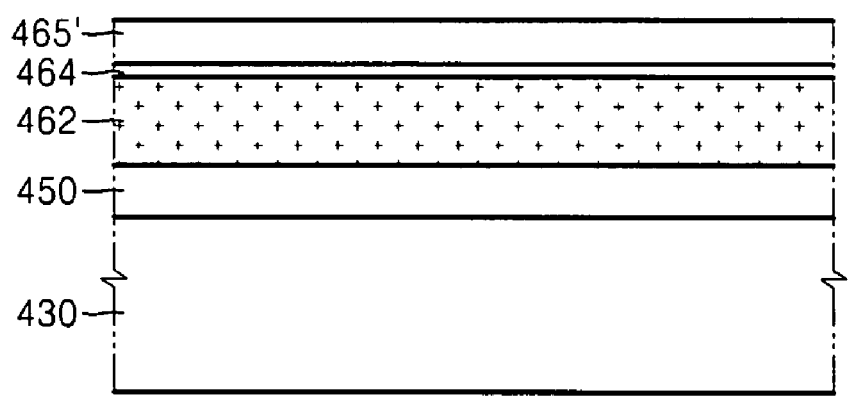

Referring to FIG. 6C, a resin layer 465' may be formed on the hard mask layer 464 for the subsequent formation of a resist pattern. Examples of a suitable material for the resin layer 465' may include a UV curing resin.

Figure 6D:

Referring to FIG. 6D, a mold M may be prepared. The mold M may be prepared for a nano-imprinting process, and a detailed pattern of the mold M may be formed to correspond to the island-shaped patterns which are to be formed from the silicon layer 462. For example, the mold. M may have one of the arrangements among the pixel arrays described with reference to FIGS. 4A through 4C, and may have different patterns and periods respectively corresponding to colors.

Figure 6E:
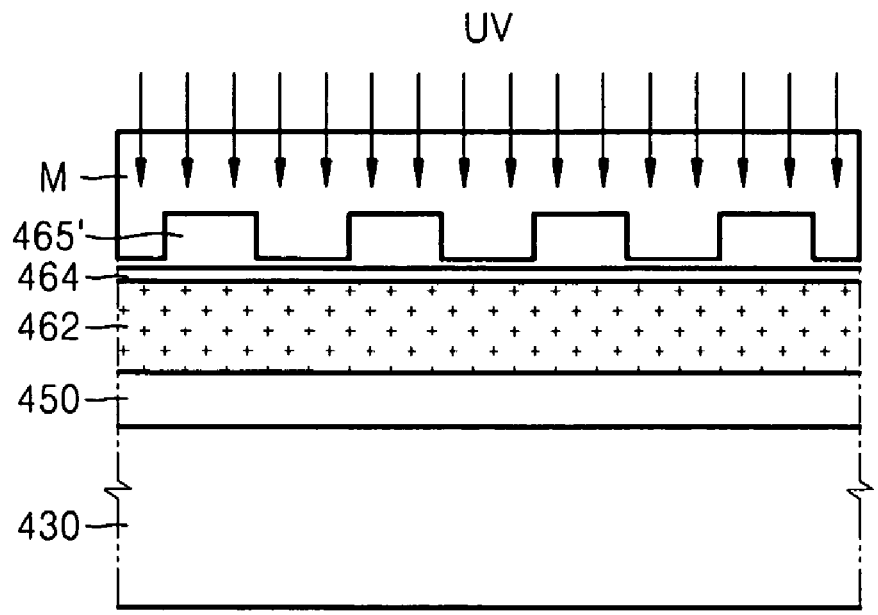
Figure 6F:
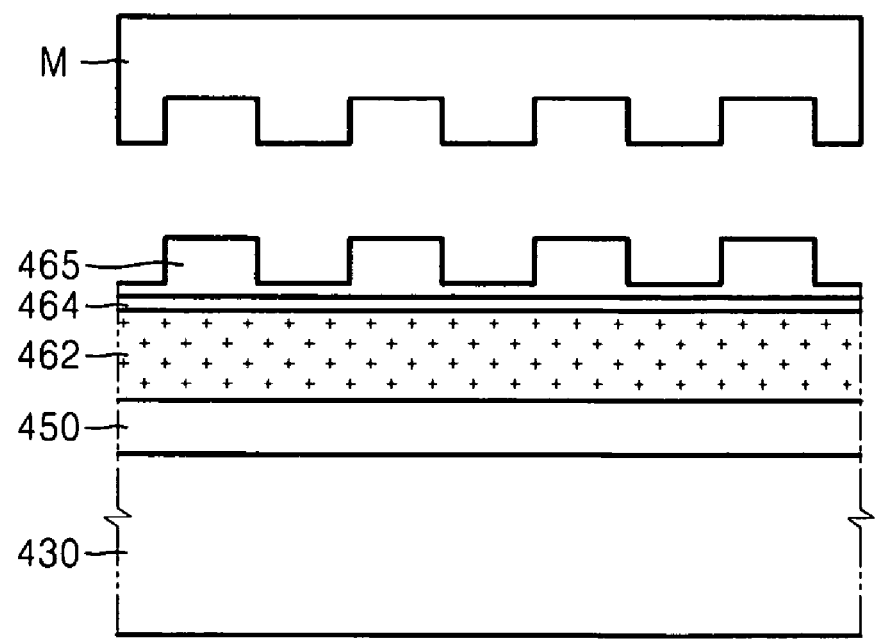

Referring to FIG. 6E, the mold M may be disposed on the resin layer 465', and ultraviolet (UV) rays may be irradiated thereon. Referring to FIG. 6F, the mold M may be separated. As a result, a resist pattern 465 is formed.

Figure 6G:
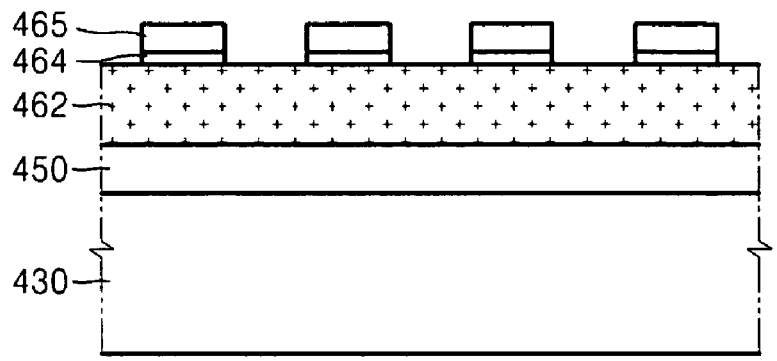
Figure 6H:
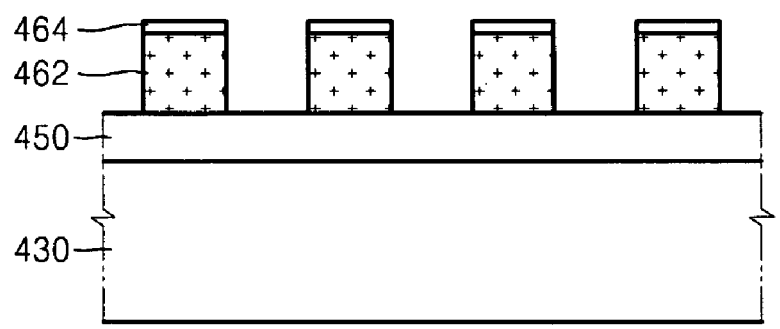

Referring to FIG. 6G, the resist pattern 465 may be used as a mask to etch the hard mask layer 464 and expose the silicon layer 462. Referring to FIG. 6H, the resist pattern 465 and the hard mask layer 464 may be used as a mask to etch the silicon layer 462 and expose the barrier layer 450. Accordingly, the silicon layer 462 may be formed as island-shaped patterns.

As described above, the silicon layer 462 may be patterned using a nano-imprinting process, and thus, the shape of pixel arrays may be selected without restrictions as compared to when a photolithography process is used. For example, a delta array among the various pixel arrays illustrated in FIGS. 4A through 4C has better color mixing characteristics and includes simpler driving circuits, but it may be difficult to apply a photolithography process to form the delta array. However, when the nano-imprinting process is used, a delta array (as well as other arrays) may be formed with relative ease.

Figure 6I:
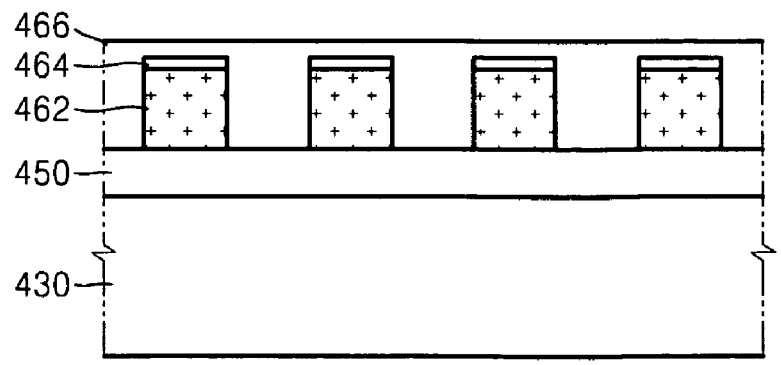

Referring to FIG. 6I, a supporting layer 466 may be further formed completely on the silicon layer 462 to fill the spaces between the island-shaped patterns and cover the island-shaped patterns.

Figure 6J:
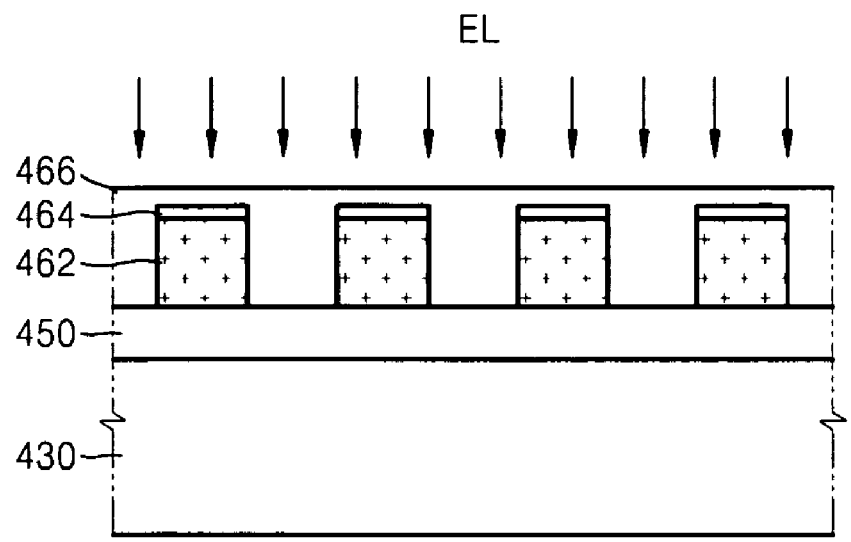

Referring to FIG. 6J, the silicon layer 462 may be recrystallized. For recrystallization, an excimer laser (EL) may be used to irradiate the silicon layer 462. The silicon layer 462 may melt in an EL annealing process and be deformed, and the supporting layer 466 helps protect the silicon layer 462 to reduce such a deformation.

Figure 6K:
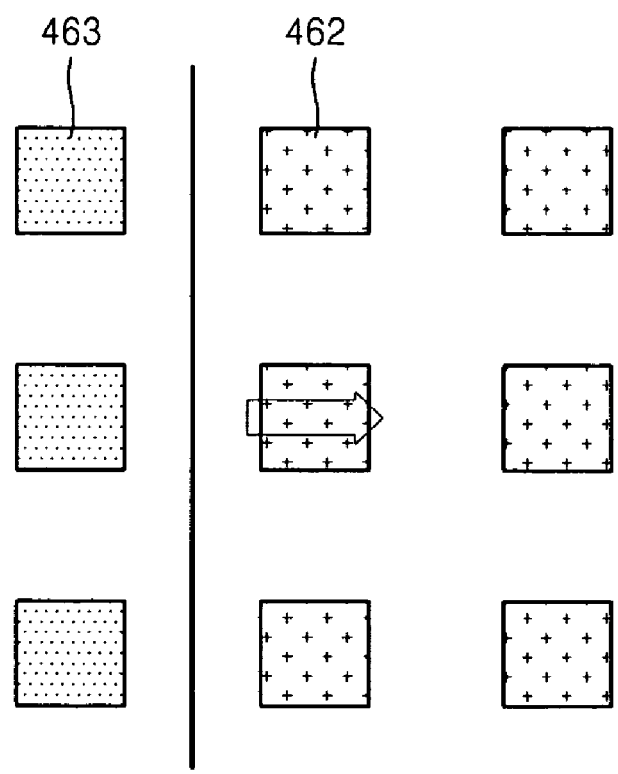
Figure 6L:
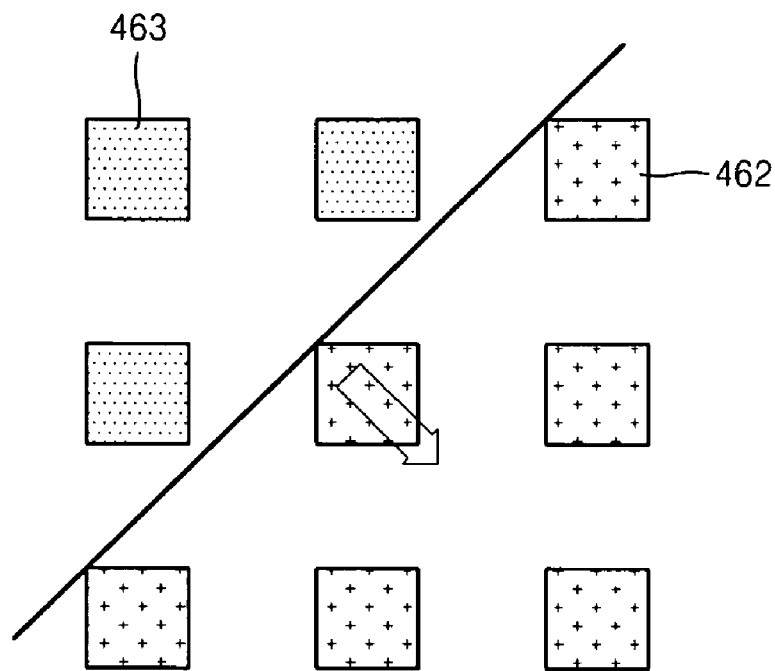

Referring to FIG. 6K, a scanning direction during EL irradiation may be parallel to an arrangement direction of patterns of the silicon layer 462 (flat leading end method). On the other hand, referring to FIG. 6L, a scanning direction may be at about 45° to the arrangement direction of the patterns of the silicon layer 462 (tapered leading end method). As shown in FIGS. 6K and 6L, the silicon layer 462 which is formed of amorphous silicon may be crystallized by the EL irradiation to a crystalline silicon layer 463. In the case of the tapered leading end method illustrated in FIG. 6L, one nucleus may be formed at each of the corners of the crystalline silicon layer 463, and thus crystallization may be performed with greater ease.

Figure 6M:
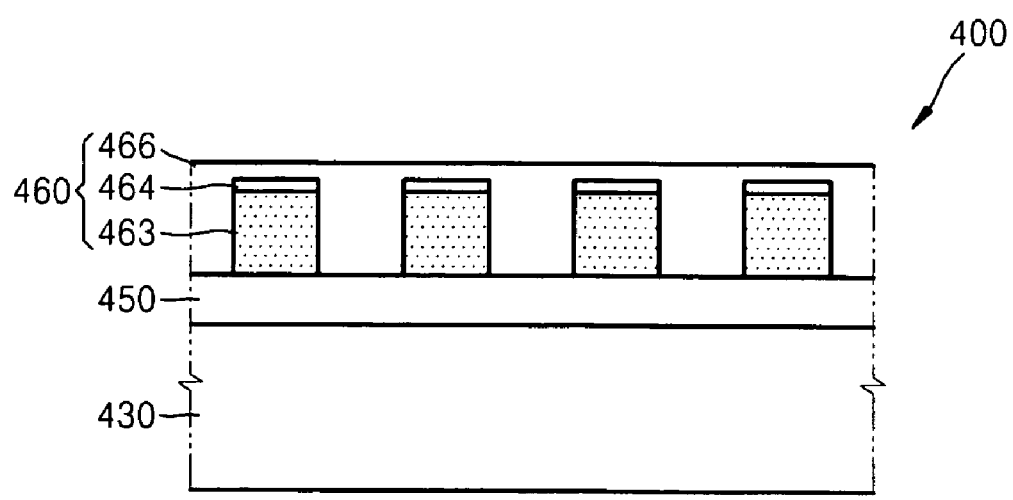

As a result, referring to FIG. 6M, a reflective color filter 400 having a photonic crystal layer 460 may be manufactured using the above-described operations. Although formation of an absorption layer on a lower portion of the transparent substrate 430 has been omitted, an absorption layer may be further formed on a lower portion of the transparent substrate 430. For example, an absorption layer may be formed on a lower portion of the transparent substrate 430 in the operation with respect to FIG. 6A, and then the subsequent operations may be performed thereafter.

The reflection wavelengths bands of a photonic crystal optical filter according to example embodiments may be determined with relative ease based on the shape and periods of relatively highly refractive patterns, and the photonic crystal optical filter may have improved filtering performance.

The reflective color filter according to example embodiments has beneficial color properties and may realize R, G, and B colors using one nano-imprinting process unlike a conventional photolithography process which needs to be performed three times to realize R, G, and B colors, thereby reducing the number of manufacturing processes. Also, the display apparatus according to example embodiments has improved quality, and a reflective color filter and a TFT array may be formed on one substrate, thereby reducing the number of manufacturing processes, the manufacturing errors, and manufacturing costs.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A photonic crystal optical filter comprising:
   a transparent substrate;
   a barrier layer on the transparent substrate, the barrier layer entirely covering a surface of the transparent substrate; and
   a photonic crystal layer on the barrier layer, the photonic crystal layer having a first material periodically arranged within a second material and an optical cut-off layer on the first material, the first material being formed into island-shaped patterns, the second material being formed to entirely cover the first material and the optical cut-off layer and to entirely fill spaces between the island-shaped patterns of the first material, and a refractive index of the first material being higher than a refractive index of the second material, the photonic crystal layer configured to reflect light having a wavelength band corresponding to a photonic band gap.

2. The photonic crystal optical filter of claim 1, wherein a difference between real parts of the refractive indices of the first material and the second material is about 2 or greater.

3. The photonic crystal optical filter of claim 1, wherein imaginary parts of the refractive indices of the first material and the second material are about 0.1 or smaller in a visible light wavelength band.

4. The photonic crystal optical filter of claim 1, wherein the first material is one selected from the group consisting of mono-crystal Si, poly Si, AlSb, AlAs, AlGaAs, AlGaInP, BP, $ZnGeP_2$, and mixtures thereof.

5. The photonic crystal optical filter of claim 1, wherein the second material is one selected from the group consisting of Air, PC, PS, PMMA, $Si_3N_4$, $SiO_2$, and mixtures thereof.

6. The photonic crystal optical filter of claim 1, wherein the optical cut-off layer is a silicon oxide layer ($SiO_2$) or a silicon nitride layer ($Si_3N_4$).

7. The photonic crystal optical filter of claim 1, wherein an absorption layer is on a lower portion of the transparent substrate.

8. The photonic crystal optical filter of claim 1, wherein the second material is formed as a supporting layer that supports the island-shaped patterns.

9. The photonic crystal optical filter of claim 8, wherein the barrier layer is formed of a same material as the second material.

10. A reflective color filter comprising:
    a transparent substrate;
    a barrier layer on the transparent substrate and having a plurality of pixel areas, the barrier layer entirely covering a surface of the transparent substrate; and a plurality of photonic crystal units on the plurality of pixel areas, each photonic crystal unit having a first material periodically arranged within a second material and an optical cut-off layer on the first material, the first material being formed into island-shaped patterns, the second material being formed to entirely cover the first material and the optical cut-off layer and to entirely fill spaces between the island-shaped patterns of the first material, a refractive index of the first material being higher than a refractive index of the second material, the photonic crystal unit configured to reflect light having a wavelength band corresponding to a photonic band gap.

11. The reflective color filter of claim 10, wherein the plurality of photonic crystal units include:
a plurality of red photonic crystal units reflecting red color light;
a plurality of green photonic crystal units reflecting green color light; and
a plurality of blue photonic crystal units reflecting blue color light.

12. The reflective color filter of claim 11, wherein the plurality of red photonic crystal units, green photonic crystal units, and blue photonic crystal units are arranged in striped patterns, in mosaic patterns, or in delta patterns.

13. The reflective color filter of claim 10, wherein the first material is formed into island-shaped patterns.

14. The reflective color filter of claim 10, wherein a difference between real parts of refractive indices of the first material and the second material is about 2 or greater.

15. The reflective color filter of claim 10, wherein imaginary parts of the refractive indices of the first material and the second material are about 0.1 or smaller in a visible light wavelength band.

16. The reflective color filter of claim 10, wherein the first material is one selected from the group consisting of monocrystal Si, poly Si, AlSb, AlAs, AlGaAs, AlGaInP, BP, ZnGeP$_2$, and mixtures thereof.

17. The reflective color filter of claim 10, wherein the second material is one selected from the group consisting of Air, PC, PS, PMMA, Si$_3$N$_4$, SiO$_2$, and mixtures thereof.

18. The reflective color filter of claim 10, wherein the optical cut-off layer is a silicon oxide layer (SiO$_2$) or a silicon nitride layer (Si$_3$N$_4$).

19. The reflective color filter of claim 10, wherein an absorption layer is on a lower portion of the transparent substrate.

20. The reflective color filter of claim 10, wherein the second material is formed as a supporting layer that supports the island-shaped patterns.

21. The reflective color filter of claim 20, wherein the barrier layer is formed of a same material as the second material.

22. A display apparatus comprising:
a liquid crystal layer of which transmissivity with respect to incident light is electrically controlled;
the reflective color filter of claim 20 that reflects light having a wavelength band corresponding to a photonic band gap among light incident on the liquid crystal layer;
an absorption layer on a lower portion of the transparent substrate; and
a thin film transistor (TFT)-array layer having a plurality of TFTs that drive the liquid crystal layer according to image information.

23. The display apparatus of claim 22, wherein the plurality of TFTs are formed in each of the pixel areas adjacent to the plurality of photonic crystal units,
wherein the plurality of TFTs and the plurality of photonic crystal units are on the transparent substrate.

24. A method of manufacturing a reflective color filter, comprising:
forming a barrier layer on a transparent substrate, the barrier layer entirely covering a surface of the transparent substrate; and
forming a photonic crystal layer on the barrier layer, the photonic crystal layer having a first material periodically arranged as island-shaped patterns within a second material and an optical cut-off layer formed on the first material, the second material being formed to entirely cover the first material and the optical cut-off layer and to entirely fill spaces between the island-shaped patterns of the first material, a refractive index of the first material being higher than a refractive index of the second material, the photonic crystal layer configured to reflect light having a wavelength band corresponding to a photonic band gap.

25. The method of claim 24, wherein forming the photonic crystal layer includes:
forming a silicon layer on the barrier layer, the silicon layer corresponding to the first material;
forming a hard mask layer on the silicon layer, the hard mask layer corresponding to the optical cut-off layer;
forming a resist pattern on the hard mask layer using an imprinting process;
etching the hard mask layer using the resist pattern as a mask to form the optical cut-off layer;
etching the silicon layer until the barrier layer is exposed using the resist pattern and the hard mask layer as a mask to form island-shaped patterns of the first material; and
recrystallizing the silicon layer.

26. The method of claim 25, further comprising:
forming a supporting layer that fills spaces between the island-shaped patterns before recrystallizing the silicon layer.

27. The method of claim 25, wherein the recrystallizing is performed using an excimer laser (EL) annealing process.

28. The method of claim 27, wherein a scanning direction during the EL annealing process is at about 45° relative to a direction along which the island-shaped patterns are arranged.

* * * * *